United States Patent Office 2,931,811
Patented Apr. 5, 1960

2,931,811

3,4,6-TRIOXO HEXAHYDROPYRIDAZINE COMPOUNDS AND A PROCESS OF MAKING SAME

Guenther Hallmann, Konstanz (Bodensee), Germany, assignor to BYK-Gulden Lomberg Chemische Fabrik G.m.b.H., Konstanz (Bodensee), Germany, a corporation of Germany No Drawing. Application April 7, 1958
Serial No. 726,626

Claims priority, application Germany April 8, 1957

5 Claims. (Cl. 260—250)

The present invention relates to 3,4,6-trioxo hexahydropyridazine compounds and more particularly to 3,4,6-trioxo hexahydropyridazine compounds carrying substituents in the 1-, 2-, and/or 5-position, and to a process of producing same.

It is one object of the present invention to provide such new 3,4,6-trioxo hexahydropyridazine compounds substituted in 1-, 2-, and/or 5-position, which are valuable physiologically active substances and are also useful as intermediates in the synthesis of pharmaceuticals.

Another object of the present invention is to provide a simple and effective process of producing such new and valuable 3,4,6-trioxo hexahydropyridazine compounds.

Other objects of the present invention and advantageous features thereof will become apparent as the description proceeds.

In principle, the present invention relates to 3,4,6-trioxo hexahydropyridazine compounds of Formula I

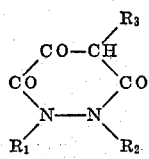

(I)

wherein $R_1$ and $R_2$ represent a straight-chain or branched alkyl radical containing 1 to 5 carbon atoms, an aryl radical which may be substituted by halogen, alkyl radicals or alkoxy groups, or an aralkyl radical, while $R_3$ represents a straight-chain or branched alkyl radical containing 1 to 5 carbon atoms, an aryl radical, an aralkyl radical, or an alicyclic radical.

3,4,6-trioxo hexahydropyridazine compounds according to the present invention are prepared by reacting a hydrazide compound of Formula II:

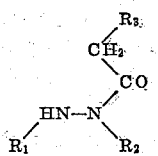

(II)

wherein $R_1$, $R_2$, and $R_3$ represent the same members as indicated above, with an oxalic acid ester in the presence of an alkaline condensing agent in an inert solvent at elevated temperature and preferably at a temperature between about 80° C. and about 150° C. Oxalic acid esters of alcohols containing 1 to 4 carbon atoms have proved to be especially suitable for the present reaction. Alkali metal alcoholates, amides, and hydrides are preferred alkaline condensing agents. The use of alkali metal hydrides produces best results, as such condensing agents allow proper control of the reaction. In order to obtain the 3,4,6-trioxo hexahydropyridazines according to the present invention in the highest yield possible, the oxalic acid ester is used in excess. The use of more than the equimolecular amount of the alkaline condensing agent, however, usually does not achieve improved results.

The solvents used in the condensation reaction preferably are ethers with a high boiling point, such as diisopropyl ether, or aromatic hydrocarbons such as benzene, toluene, and xylene. When using an alcoholate as condensing agent, lower aliphatic alcohols containing 2 to 4 carbon atoms may also be used as reaction solvent. In general, the boiling point of the solvent used has proved to be the most favorable reaction temperature. The reaction duration is between about 6 hours and about 12 hours. After the reaction is completed, the solvent is distilled off, the residue is taken up with water, the aqueous solution is clarified and purified if necessary, and the 3,4,6-trioxo hexahydropyridazine compound is precipitated by the addition of dilute acids. On an average, the yield of purified final product is 60-70% of the theoretical amount. The resulting compounds are new and have not yet been described in the literature. Their structure as trioxo compounds is clearly shown by their infrared absorption spectrum.

The new 3,4,6-trioxo hexahydropyridazine compounds have interesting pharmacological properties. For instance, they show a good sedative effect on the central nervous system. Furthermore, their toxicity is low. 1,2-diphenyl-3,4,6-trioxo-5-n-butyl hexahydropyridazine, for instance, has an $LD_{50}$ of 550 mg./kg. only when administered perorally. Its $LD_{50}$ was determined according to the method of Kaerber. Their sodium salts have a considerable solubilizing effect on a number of medicinal compounds which are difficultly soluble in water. For instance, they are useful as solubilizing agent for analgesics of the antipyradine series, such as 4-dimethylamino- or 4-mono-isopropylamino-1-phenyl-2,3-dimethyl pyrazolone-5.

The following examples serve to illustrate the present invention without, however, limiting the same thereto.

EXAMPLE 1

*Preparation of 1,2-diphenyl-3,4,6-trioxo-5-n-butyl hexahydropyridazine*

141 g. (0.5 mole) of n-caproic acid-N,N'-diphenyl hydrazide and 146 g. (1 mole) of oxalic acid diethyl ester are added to a solution of 11.5 g. (0.5 mole) of metallic sodium in 200 cc. of absolute alcohol. The mixture is refluxed for 12 hours. Thereafter, the solvent is distilled off under atmospheric pressure. The last traces of ethanol are removed by distillation in a vacuum. The evaporation residue is dissolved in water. In order to remove untreated starting material, the aqueous solution is extracted two to three times with benzene. The solution is filtered and rendered acid by the addition of dilute hydrochloric acid. The precipitated 1,2-di-phenyl-5-n-butyl-3,4,6-trioxo hexahydropyridazine is filtered with suction, washed, dried, and recrystallized from benzene. The yield is 100 g. (60% of the theoretical amount). The compound has a melting point of 134° C.

EXAMPLE 2

*Preparation of 1,2,5-triphenyl-3,4,6-trioxo hexahydropyridazine*

151.5 g. (0.5 mole) of phenyl acetic acid-N,N'-diphenyl hydrazide and 150 g. (1.03 moles) of oxalic acid ethyl ester are dissolved in 400 cc. of anhydrous benzene. 24 g. of a 50% oily suspension of sodium hydride in benzene, which corresponds to 0.5 mole of sodium hydride, are added thereto. The mixture is refluxed for 6 hours. The solvent is distilled off and the residue is worked up as described in Example 1. The resulting crude 1,2,5-triphenyl-3,4,6-trioxo hexahydropyridazine is recrystallized from ethanol. The yield is 116.5 g. (65% of the theoretical amount). The compound melts at 217–218° C.

In place of n-caproic acid-N,N'-diphenyl hydrazide used in Example 1 or of phenyl acetic acid-N,N'-diphenyl hydrazide used in Example 2 as the one reaction component, there can be employed equimolecular amounts of other hydrazides of Formula I, wherein $R_1$, $R_2$, and $R_3$ have the following meaning, while otherwise the procedure is the same as described in the preceding examples:

| Compound | $R_1$ | $R_2$ | $R_3$ |
|---|---|---|---|
| n butyric acid-N,N dimethyl hydrazide | $CH_3$ | $CH_3$ | $C_2H_5$. |
| propionic acid-N,N-di isopropyl hydrazide | $CH(CH_3)_2$ | $CH(CH_3)_2$ | $CH_3$. |
| isoamyl hydrazide | isoamyl | isoamyl | iso-$C_4H_9$. |
| β-phenyl propionic acid-N,N'-dibenzyl hydrazide | benzyl | benzyl | benzyl. |
| (p-methyl phenyl) acetic acid-N,N'-d-p-tolyl hydrazide | p-tolyl | p-tolyl | p-tolyl. |
| (o-chloro phenyl) acetic acid-N,N'-di-(o-chloro phenyl) hydrazide | o-chloro phenyl | o-chloro phenyl | o-chloro phenyl. |
| (p-methoxy phenyl) acetic acid-N,N'-diphenyl hydrazide | phenyl | phenyl | p-methoxy phenyl. |
| β-(o-methyl phenyl) propionic acid-N,N'-diphenyl hydrazide | do | do | o-methyl benzyl. |
| γ-(p-bromophenyl)-n-butyric acid-N,N'-di-n-propyl hydrazide | propyl | propyl | (p-bromo phenyl)-ethyl. |
| cyclohexyl acetic acid-N,N'-diphenyl hydrazide | phenyl | phenyl | cyclo-hexyl. |

Although oxalic acid diethyl ester is the preferred oxalic acid ester used as the other reaction component, it is, of course, understood that other lower alkyl esters of oxalic acid, such as the dimethyl ester, the di-n-butyl ester, the di-isopropyl ester can be reacted with the substituted monoacyl hydrazides of Formula I in the same manner as described hereinabove in the preceding examples.

Of course, many changes and variations in the reaction components, the alkaline condensing agents, the inert solvents used, in the amounts thereof employed, in the reaction conditions, temperature and duration, in the methods of working up the reaction mixture and of isolating and purifying the reaction products, and the like may be made by those skilled in the art in accordance with the principles set forth herein and in the claims annexed hereto.

I claim:
1. 1,2-diphenyl-5-n-butyl-3,4,6-trioxo hexahydropyridazine.
2. 1,2,5-triphenyl-3,4,6-trioxo hexahydropyridazine.
3. The 3,4,6-trioxo hexahydropyridazine compound of the formula

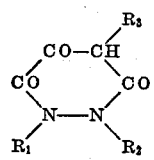

wherein $R_1$ and $R_2$ represent members selected from the group consisting of the lower alkyl radicals containing 1 to 5 carbon atoms, the phenyl radical, the halogen substituted phenyl radical, the lower alkoxy-substituted phenyl radical, the lower alkyl-substituted phenyl radical, and the benzyl radical, while $R_3$ represents a member selected from the group consisting of the lower alkyl radicals containing 1 to 5 carbon atoms, the phenyl radical, the benzyl radical, and the cyclohexyl radical.

4. In the process of producing 3,4,6-trioxo hexahydropyridazine compound of the formula

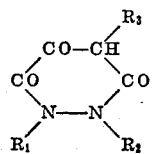

wherein $R_1$ and $R_2$ represent members selected from the group consisting of the lower alkyl radicals containing 1 to 5 carbon atoms, the phenyl radical, the halogen substituted phenyl radical, the lower alkoxy substituted phenyl radical, the lower alkyl-substituted phenyl radical, and the benzyl radical, while $R_3$ represents a member selected from the group consisting of the lower alkyl radicals containing 1 to 5 carbon atoms, the phenyl radical, the benzyl radical, and the cyclohexyl radical, the steps which comprise heating the carboxylic acid hydrazide of the formula

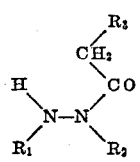

wherein $R_1$, $R_2$, and $R_3$ represent the same members as indicated above with an oxalic acid lower alkyl ester with the addition of an alkaline condensing agent selected from the group consisting of the alkali metal lower alcoholates, the alkali metal amides, and the alkali metal hydrides in an inert organic solvent to cause condensation of said carboxylic acid hydrazide with the oxalic acid lower alkyl ester.

5. The process according to claim 4, wherein the reaction mixture is heated to a temperature between about 80° C. and about 150° C.

No references cited.